United States Patent [19]

Meguriya et al.

[11] Patent Number: 5,714,265
[45] Date of Patent: Feb. 3, 1998

[54] COMPOSITE BODY OF SILICONE RUBBER AND SILICONE-EPOXY RESIN AND METHOD FOR THE PREPARATION THEREOF

[75] Inventors: Noriyuki Meguriya; Takeo Yoshida; Yoshiteru Kobayashi, all of Gunma-ken, Japan

[73] Assignee: Shin-Etsu Chemical Co., Ltd., Tokyo, Japan

[21] Appl. No.: 559,535

[22] Filed: Nov. 16, 1995

[30] Foreign Application Priority Data

Nov. 17, 1994 [JP] Japan ................... 6-283342

[51] Int. Cl.$^6$ .................. B32B 27/26; B32B 27/38; B32B 1/10
[52] U.S. Cl. ............... 428/413; 428/447; 264/255; 264/347; 264/DIG. 42
[58] Field of Search .................. 528/15, 16, 24; 525/476; 428/447, 413; 264/255, 347, DIG. 42

[56] References Cited

U.S. PATENT DOCUMENTS 4,814,231  3/1989  Onohara et al. ................. 428/447
5,585,445  12/1996  Meguriya et al. ................ 525/476

*Primary Examiner*—Leszek Kiliman, PhD
*Assistant Examiner*—D. Lawrence Tarazano
*Attorney, Agent, or Firm*—Millen, White, Zelano, & Branigan, P.C.

[57] ABSTRACT

Proposed is a method for the preparation of a monolithically integrated composite cured body consisting of a part of cured silicone rubber composition and a part of a silicone-epoxy resin composition firmly bonded together without using any primer or adhesive by first curing either one of the compositions in a metal mold and then bringing the other of the compositions into direct contact with the already cured part in the metal mold to be cured thereon. Firm bonding between the parts can be obtained when the silicone rubber composition is of the peroxide-curable or the hydrosilation-curable type and the silicone-epoxy resin composition comprises:
(a) a curable epoxy resin;
(b) an alkenyl group-containing organopolysiloxane;
(c) an organohydrogenpolysiloxane;
(d) an organosilicon compound having at least one silanol group in a molecule;
(e) an organic aluminum compound such as aluminum benzoate; and
(f) a compound of a platinum group metal such as chloroplatinic acid, each in a specified weight proportion.

12 Claims, 1 Drawing Sheet

COMPOSITE BODY OF SILICONE RUBBER AND SILICONE-EPOXY RESIN AND METHOD FOR THE PREPARATION THEREOF

BACKGROUND OF THE INVENTION

The present invention relates to a monolithic cured body of a silicone-epoxy resin and a silicone rubber and also relates to a method for the preparation thereof. More particularly, the invention relates to a monolithic composite body having usefulness in various application fields including electrics, electronics, office-automation instruments, automobiles, precision instruments and the like and a method for the preparation of such a composite body.

A large number of proposals have been made heretofore for the method of adhesive bonding of a silicone rubber and an organic resin. For example, proposals have been made for a method in which the surface of a molded and cured organic resin article is coated with a primer and an uncured silicone rubber is brought into direct contact therewith and cured to effect adhesive bonding therebetween and a method in which a self-adhesive silicone rubber composition is cured in direct contact with a molded organic resin article. As to this self-adhesive silicone rubber composition, a large number of patent applications have been filed for the inventions of which the scope, in particular, consists in the selection of an adhesive ingredient compounded therein. Proposals have been made also for a method in which an organic resin is admixed with an organopolysiloxane containing hydrogen atoms directly bonded to the silicon atoms and adhesively bonded to a silicon rubber of the addition-curable type (U.S. Pat. Nos. 4,686,124, 4,814,231 and 4,834,721 and EP 143994A corresponding to Japanese Patent Publication 2-34311), integration by physical engagement of a silicone rubber-made body to an organic resin article (Japanese Patent Publication 63-45292), a method in which a silicone rubber is adhesively bonded to and integrated with a polyolefin resin after grafting of a compound having an aliphatically unsaturated group and a hydrolyzable group bonded to the silicon atom (EP 276790A corresponding to Japanese Patent Kokai 63-183843) and so on.

The method to effect adhesive bonding by the use of a primer is rather troublesome in the application of the primer to the molded resin article taken out of a metal mold. The method of using a self-adhesive silicone rubber composition brought into direct contact with and cured on a molded resin article has a serious defect that, when a metal mold is used for molding of the organic resin and the silicone rubber composition, the silicone rubber per se causes adhesive bonding to the metal mold. Further, in the method of admixture of an organic resin with an organopolysiloxane having hydrogen atoms directly bonded to the silicon atoms, it is sometimes difficult to obtain inherent characteristics because of the changes caused in the organic resin per se as a consequence of admixture of the organopolysiloxane. Further, the method of integration by physical engagement is not free from the troubles of disengagement by an external physical force.

In recent years, on the other hand, application of silicone rubbers is expanding in the fields of electrics, electronics, office-automation instruments, automobiles and the like by virtue of the high reliability recognized relative to the heat resistance, weatherability, electric properties and the like of the silicone rubbers in general. Accordingly, it is desired to provide a monolithic molded article with stable product quality by a firm adhesive bonding between a thermosetting resin and a silicone rubber.

SUMMARY OF THE INVENTION

The present invention accordingly has an object to solve these problems in the prior art and to provide an integrally molded monolithically integrated composite body with stable product quality by virtue of a firm adhesive bonding between a part of a cured thermosetting resin and a part of a cured silicone rubber as well as to provide a reliable method for the preparation of such a monolithically integrated composite body.

Thus, the monolithic composite body provided by the present invention is an integral body consisting of a part of a cured silicone rubber composition and a part of a cured silicone-epoxy resin composition in direct adhesive bonding without intervention of a layer of any third material such as a primer or adhesive.

In particular, the above mentioned cured silicone rubber is obtained from a silicone rubber composition which is curable by means of an organic peroxide as a curing agent or curable by the hydrosilation reaction between silicon-bonded ethylenically unsaturated groups and silicon-bonded hydrogen atoms.

Further, the above mentioned silicone-epoxy resin composition is a uniform blend which comprises:

(a) 100 parts by weight of a curable epoxy resin;
(b) from 5 to 500 parts by weight of an organopolysiloxane having at least two, on average, lower alkenyl groups in a molecule;
(c) from 1 to 50% by weight, based on the component (b), of an organohydrogenpolysiloxane having at least one hydrogen atom bonded to the silicon atom in a molecule and represented by the general composition formula

$$R^4{}_f H_g SiO_{(4-f-g)/2}, \qquad (I)$$

in which $R^4$ denotes an unsubstituted or substituted monovalent hydrocarbon group, the subscript f denotes a positive number in the range from 1 to 2.4 and the sub script g denotes a positive number not exceeding 1;

(d) from 0.1 to 10 parts by weight of an organosilicon compound having at least one silanol group in a molecule;
(e) from 0.001 to 10 parts by weight of an organic aluminum compound; and
(f) a compound of a platinum group metal in an amount in the range from 0.1 to 500 ppm by weight as the platinum group metal, based on the component (b).

The invention further provides a reliable method for the preparation of a monolithically integrated cured body as defined above, which method comprises the steps of:

(A) curing either one of a curable silicone rubber composition of the organic peroxide-curable type or the hydrosilation-curable type and a curable silicone-epoxy resin composition as defined above at room temperature or by heating, preferably, in a metal mold;

(B) bringing the other of the curable silicone rubber composition and the curable silicone-epoxy resin composition into direct contact with the body cured in step (A) in the metal mold; and (C) curing the composition introduced into the metal mold in step (B) at room temperature or by heating, preferably, in the same metal mold.

DETAILED DESCRIPTION OF THE PREFERRED EMBODIMENTS

Figure 1:
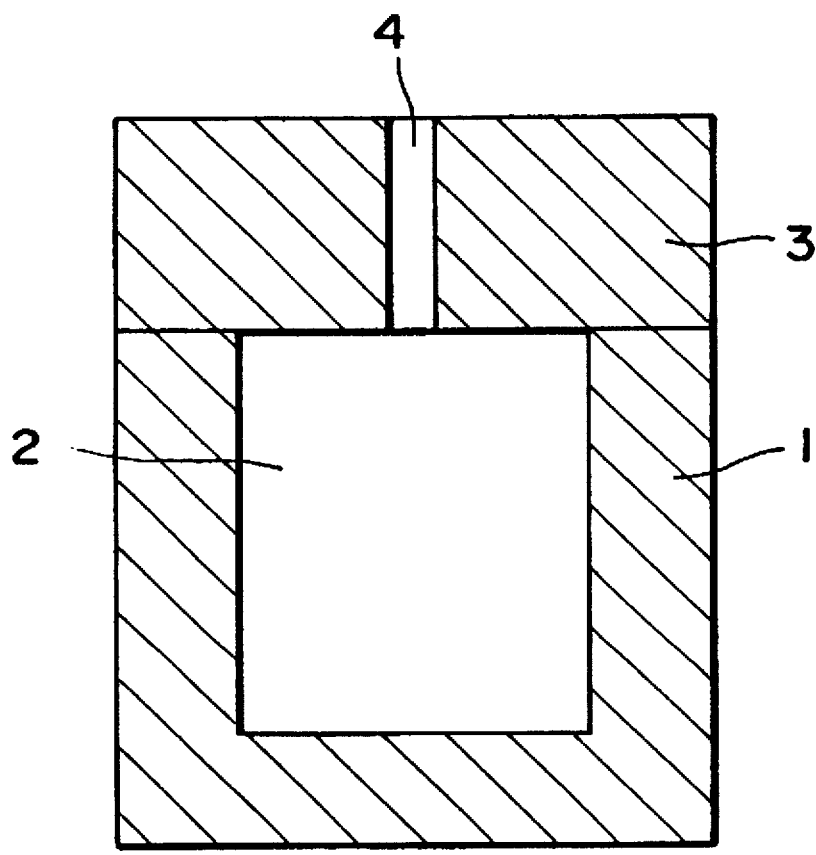
FIG. 1 is an explanatory figure for the purpose of schematic illustration of the inventive method by way of a vertical cross section of the metal mold used in the examples of the present invention and in the comparative example.

The inventors have conducted extensive investigations to solve the above mentioned problems in the prior art and, as a result, have arrived at a discovery that an integrally molded monolithic composite body consisting of two parts bonded together with an adhesive bonding strength capable of fully withstanding practical uses can be obtained conveniently and within a short time by the selection of a silicone rubber composition of the organic peroxide-curable type or the hydrosilation-curable type for the part of the cured silicone rubber and a specific polymer blend of a silicone resin and an epoxy resin for the part of the cured organic resin without using any primer or adhesive leading to completion of the present invention.

The silicone rubber composition of the organic peroxide-curable type usable in the present invention includes a composition in the liquid form or a pasty form at room temperature, of which the principal ingredients include:

i) an organopolysiloxane, preferably, having at least two on an average of lower alkenyl groups, i.e. having 1 to 4 carbon atoms, in a molecule; and ii) an organic peroxide in a catalytic amount.

The silicone rubber composition of the organic peroxide-curable type can be cured by standing at room temperature or, preferably, by heating and converted into a cured rubbery elastomer.

The organopolysiloxane as the component i) has a viscosity in the range from 100 cp (centipoise) to 10,000,000 cp or, preferably, from 1,000 cp to 1,000,000 cp at room temperature or at 25° C. and is represented by the general composition formula $R_aSiO_{(4-a)/2}$, in which R is selected from unsubstituted or substituted monovalent hydrocarbon groups having 1 to 12 carbon atoms or, preferably, 1 to 8 carbon atoms including alkyl groups such as methyl, ethyl, propyl, isopropyl, n-butyl, isobutyl, tert-butyl, hexyl, cyclohexyl, octyl and decyl groups, alkenyl groups such as vinyl, allyl, propenyl, isopropenyl, butenyl, isobutenyl, hexenyl and cyclohexenyl groups, aryl groups such as phenyl, tolyl, xylyl and naphthyl groups, aralkyl groups such as benzyl, phenylethyl and phenylpropyl groups, halogen-substituted hydrocarbon groups such as chloromethyl, chloropropyl, bromoethyl and 3,3,3-trifluoropropyl groups, cyano group-substituted hydrocarbon groups such as cyanoethyl group, and so on.

When two or more on an average of the monovalent hydrocarbon groups bonded to the silicon atoms in a molecule of the organopolysiloxane are alkenyl groups, it is preferable that each of the silicon atoms at the molecular chain terminals has the alkenyl group bonded thereto although the groups denoted by R in a molecule can be selected each independently from the others.

In the general composition formula, the subscript a is a positive number in the range from 1.9 to 2.2 or, preferably, from 1.95 to 2.1. Although the molecular structure of the organopolysiloxane is not particularly limited, including a straight structure and branched structure containing $RSiO_{3/2}$ units and/or $SiO_{4/2}$ units, it is usually preferable that the organopolysiloxane has a straight linear molecular structure basically composed of repetition of the difunctional $R_2SiO$ units forming the main chain part and blocked at the molecular chain terminals with $R_3SiO_{1/2}$ units. Though not particularly limited, the alkenyl groups are preferably vinyl groups and the other groups bonded to the silicon atoms are desirably methyl groups or phenyl groups. The organopolysiloxane can be obtained by a known method or, namely, by conducting the siloxane-rearrangement equilibration reaction of an organocyclopolysiloxane oligomer and a hexaorganodisiloxane as the source of the terminal groups in the presence of an alkali or acid catalyst.

The organic peroxide as the component ii) is used as a crosslinking agent to promote the crosslinking reaction between molecules of the organopolysiloxane. The organic peroxide is exemplified, for example, by benzoyl peroxide, o-monochlorobenzoyl peroxide, bis-2,4-dichlorobenzoyl peroxide, dicumyl peroxide, tert-butylperoxy benzoate, di-tert-butyl peroxide, p-monochlorobenzoyl peroxide, tert-butyl cumyl peroxide, 1,1-bis(tert-butylperoxy)-3,3,5-trimethyl cyclohexane, 2,5-dimethyl-2,5-bis(tert-butylperoxy) hexane, 1,6-bis(tert-butylperoxycarbonyloxy) hexane and the like though not particularly limited thereto.

The compounding amount of the organic peroxide as the component ii) can be adequately selected depending on the desired curing velocity but it is usually in the range, per 100 parts of the organopolysiloxane, the term "parts" referring to "parts by weight" here and hereinafter if not specified otherwise, from 0.1 to 10 parts or, preferably, from 0.2 to 2 parts.

It is optional that these components i) and ii) are compounded together with a filler in order to control the flowability of the silicone rubber composition or to improve the mechanical strengths of the shaped articles therefrom. Examples of suitable fillers include reinforcing fillers such as precipitated silica, fumed silica, calcined silica, fumed titanium dioxide and the like and non-reinforcing fillers such as pulverized quartz, diatomaceous earth, asbestos, aluminosilicate, iron oxide, zinc oxide, calcium carbonate and the like. They can be used as such or after a surface treatment with an organic silicon compound such as hexamethyl disilazane, trimethyl chlorosilane and polymethyl siloxanes. Further, various known additives such as pigments, heat resistance improvers, flame retardant agents, plasticizers and the like can be compounded according to need.

The silicone rubber composition of the hydrosilation curable-type can be in a liquid form or pasty form at room temperature. The composition comprises, as the principal ingredients:

iii) an organopolysiloxone containing at least two lower alkenyl groups in a molecule;

iv) an organohydrogenpolysiloxane in the form of a liquid at room temperature; and v) a catalyst for promoting the hydrosilation reaction, and the composition can be converted into a cured rubbery elastomer by standing at room temperature or by heating.

The alkenyl group-containing organopolysiloxane as the component iii) has a viscosity in the range from 100 cp to 1,000,000 cp or, preferably, from 1,000 cp to 300,000 cp at room temperature or at 25° C. and represented by the general composition formula $R^1_bSiO_{(4-b)/2}$, in which $R^1$ is an unsubstituted or substituted monovalent hydrocarbon group having 1 to 12 carbon atoms or, preferably, 1 to 8 carbon atoms, and the subscript b is a positive number in the range from 1.8 to 2.4 or, preferably, from 1.9 to 2.2. The groups denoted by $R^1$ can be exemplified by those given above as the examples of the groups denoted by R in the component i). Examples of the monovalent hydrocarbon group denoted by $R^1$ include alkyl groups such as methyl, ethyl and propyl groups, alkenyl groups such as vinyl, allyl, propenyl and butenyl groups, aryl groups such as phenyl, tolyl and xylyl groups, aralkyl groups such as benzyl group, halogen-substituted hydrocarbon groups such as 3,3,3-trifluoropropyl group, cyano group-substituted hydrocarbon groups such as cyanoethyl group, and so on. When at least two on an average of the hydrocarbon groups in a molecule are alkenyl groups, it is preferable that each of the silicon atoms at the molecular chain terminals has an alkenyl group bonded thereto although the groups denoted by $R^1$ can be selected each independently from the others. The molecular structure of the organopolysiloxane can be a straight chain-like structure or a branched structure containing the $R^1SiO_{3/2}$ units and/or $SiO_{4/2}$ units but it is usually preferable that the organopolysiloxane is basically a straight chain-like organopolysiloxane consisting of a repetition of the difunctional $R^1{}_2SiO$ units forming the main chain portion and blocked at the molecular chain terminals each with a monofunctional $R^1{}_3SiO_{1/2}$ unit. The alkenyl group is preferably a vinyl group and the other groups denoted by $R^1$ are desirably methyl groups and phenyl groups. This organopolysiloxane can be prepared by a known method.

The organohydrogenpolysiloxane as the component iv) contains at least two or, preferably, at least three on an average of hydrogen atoms directly bonded to the silicon atoms or, namely, SiH groups, in a molecule and acts as a crosslinking agent by the hydrosilation reaction between these SiH groups and the alkenyl groups in the component iii) in the presence of the component v) described later as a catalyst. The molecular structure of the organohydrogenpolysiloxane is not particularly limited and various kinds of those prepared heretofore having a straight chain-like, branched, cyclic or three-dimensional network structure can be used. In particular, those represented by the following general composition formula can be used satisfactorily:

in which $R^2$ is an unsubstituted or substituted monovalent hydrocarbon group having 1 to 8 carbon atoms free from an aliphatically unsaturated linkage. It can be of the same kind as those exemplified for R in the above mentioned component i) excepting the alkenyl groups and exemplified by alkyl groups such as methyl, ethyl and propyl groups, aryl groups such as phenyl and tolyl groups, cycloalkyl groups such as cyclohexyl group, aralkyl groups such as benzyl group, substituted alkyl groups such as 3,3,3-trifluoropropyl group and so on. The sub script c is a positive number in the ranges from 0.8 to 2.1 or, preferably, from 1.2 to 2.0 and the subscript d is a positive number in the range from 0.002 to 1 or, preferably, from 0.01 to 1 with the proviso that c+d is in the range from 1 to 3 or, preferably, from 1.5 to 2.7. It is preferable that the viscosity of the organohydrogenpolysiloxane at 25° C. is in the range from 1 to 1,000 cp or, preferably, from 5 to 200 cp.

The organohydrogenpolysiloxane includes methyl hydrogen polysiloxanes blocked at each molecular terminal with a trimethylsiloxy group, copolymers of dimethyl siloxane-methyl hydrogen siloxane units blocked at each molecular terminal with a trimethylsiloxy group, dimethyl polysiloxanes blocked at each molecular terminal with a dimethyl hydrogen siloxy group, copolymers of dimethyl siloxane-methyl hydrogen siloxane units blocked at each molecular terminal with a dimethyl hydrogen siloxy group, copolymers of methyl hydrogen siloxane-diphenyl siloxane units blocked at each molecular terminal with a trimethylsiloxy group, copolymers of methyl hydrogen siloxane-diphenyl siloxane units blocked at each molecular terminal with a trimethyl siloxy group, copolymers composed of the monofunctional $(CH_3)_2HSiO_{1/2}$ units and tetrafunctional $SiO_{4/2}$ units, copolymers composed of the difunctional $(CH_3)_2HSiO_{1/2}$ units, tetrafunctional $SiO_{4/2}$ units and trifunctional $(C_6H_5)SiO_{3/2}$ units and the like.

The compounding amount of the organohydrogenpolysiloxane as the component iv) is preferably in the range from 0.1 to 30 parts or, preferably, from 0.3 to 10 parts per 100 parts of the organopolysiloxane as the component iii). Alternatively, the compounding amount can be specified as such an amount that the molar ratio of the hydrogen atoms directly bonded to the silicon atoms in the component iv) to the alkenyl groups in the component iii) is in the range from 0.2 to 10 moles/moles or, preferably, from 0.5 to 5 moles/moles.

The catalyst for the hydrosilation reaction as the component v) is exemplified by the compounds of a platinum group metal such as platinum black, platinic chloride, chloroplatinic acid, reaction products of chloroplatinic acid and a monohydric alcohol, complexes of chloroplatinic acid and an olefin, platinum bisacetoacetate, palladium-based catalysts, rhodium-based catalysts and the like. The compounding amount of this catalyst for the hydrosilation reaction can be a catalytic amount but, usually, it is in the range from 0.1 to 1,000 ppm or, preferably, from 1 to 500 ppm as the weight of platinum or the platinum-group metal based on the total of the components iii) and iv).

These components iii), iv) and v) can be compounded together with a filler with an object to control the flowability of the composition or to increase the mechanical strengths of the shaped and cured articles of the composition. Suitable fillers include reinforcing fillers such as precipitated silica, fumed silica, calcined silica, fumed titanium dioxide and the like and non-reinforcing fillers such as pulverized quartz, diatomaceous earth, asbestos, aluminosilicate, iron oxide, zinc oxide, calcium carbonate and the like. These fillers can be used as such or after a surface treatment with an organic silicon compound such as hexamethyl disilazane, trimethyl chlorosilane and polymethyl siloxanes. Further, various kinds of known additives such as pigments, heat resistance improvers, flame retardant agents, plasticizers and the like can be compounded according to need.

As the curable silicone-epoxy resin composition used in the present invention, those given below are satisfactory though not particularly limited thereto provided that the composition has curability and is capable of being converted into a cured body either by standing at room temperature or by heating.

The curable silicone-epoxy resin composition is a uniform blend which comprises:
(a) 100 parts of a curable epoxy resin;
(b) from 5 to 500 parts of an organopolysiloxane having at least two on an average of lower alkenyl groups in a molecule;
(c) from 1 to 50% by weight, based on the component (b), of an organohydrogenpolysiloxane having at least one hydrogen atom bonded to the silicon atom in a molecule and represented by the general composition formula

in which $R^4$ denotes an unsubstituted or substituted monovalent hydrocarbon group, the sub script f denotes a positive number in the range from 1 to 2.4 and the subscript g denotes a positive number not exceeding 1;
(d) from 0.1 to 10 parts of an organosilicon compound having at least one silanol group in a molecule;
(e) from 0.001 to 10 parts of an organic aluminum compound; and
(f) a compound of a platinum group metal in an amount in the range from 0.1 to 500 ppm by weight as the platinum group metal, based on the component (b).

The epoxy resin as the component (a) can be any of those conventionally used in a curable epoxy resin composition and particular examples thereof include bisphenol A-type epoxy resins, bisphenol F-type epoxy resins, phenol novolac-type epoxy resins, cresol novolac-type epoxy resins, alicyclic epoxy resins, epoxy resins containing a heterocyclic ring such as triglycidyl isocyanate and hidantoin epoxy, hydrogenated bisphenol A-type epoxy resins, aliphatic epoxy resins such as propyleneglycol diglycidyl ether, pentaerithritol polyglycidyl ether and the like, epoxy resins obtained by the reaction of an aromatic, aliphatic or alicyclic carboxylic acid and epichlorohydrin, epoxy resins containing a spiro ring, glycidyl ether-type epoxy resins as a reaction product of an o-allylphenol novolac compound and epichlorohydrin, glycidyl ether-type epoxy resins as a reaction product of a diallyl bisphenol compound having allyl groups at the ortho-positions relative to the hydroxy groups in bisphenol A and epichlorohydrin, and so on.

The organopolysiloxane having at least two lower alkenyl groups on an average in a molecule as the component (b) has a viscosity in the range from 100 cp to 1,000,000 cp or, preferably, from 1,000 cp to 300,000 cp at 25° C. and is represented by the general composition formula $R^3_e SiO_{(4-e)/2}$, in which $R^3$ is an unsubstituted or substituted monovalent hydrocarbon group having 1 to 12 carbon atoms or, preferably, 1 to 8 carbon atoms, which can be any one of those exemplifying the groups denoted by R in the component i) of the above described silicone rubber composition. Particular examples of the group denoted by $R^3$ include alkyl groups such as methyl, ethyl, propyl, butyl, hexyl and cyclohexyl groups, alkenyl groups such as vinyl, allyl, propenyl and butenyl groups, aryl groups such as phenyl, tolyl and xylyl groups, aralkyl groups such as benzyl group, halogen-substituted hydrocarbon groups such as 3,3,3-trifluoropropyl group, cyano group-substituted hydrocarbon groups such as cyanoethyl group, and so on. The groups denoted by $R^3$ in a molecule each can be of the same kind as or can be different from the others although the respective groups can be selected independently each from the others. It is preferable that the organopolysiloxane contains at least two alkenyl groups on an average in a molecule and, more preferably, each of the silicon atoms at the molecular chain terminals has an alkenyl group bonded thereto. The subscript e is a positive number in the range from 1.8 to 2.4 so that the organopolysiloxane is a straight chain-like diorganopolysiloxane blocked at each molecular chain terminal with a $R^3_3SiO_{1/2}$ unit, although the molecular structure thereof can be a straight chain-like structure, a branched structure containing the $R^3SiO_{3/2}$ units and/or $SiO_{4/2}$ units or a resinous structure with a three-dimensional network. The groups bonded to the silicon atoms can be basically any of those mentioned above but, desirably, the alkenyl groups are vinyl groups and the other groups include phenyl groups in respect of enhancement of the miscibility of the organopolysiloxane with the epoxy resin. This organopolysiloxane can be prepared by a known method.

The compounding amount of the component (b) is, per 100 parts of the curable epoxy resin as the component (a), from 5 to 500 parts or, preferably, from 20 to 200 parts since, when the amount is too small, the heat resistance, mold releasability and other desirable properties as the inherency of silicone resins cannot be fully exhibited after curing of the silicone-epoxy resin composition to be obtained while, on the other hand, when the compounding amount of the component (b) is too large, the cured material cannot be imparted with sufficiently high mechanical strengths.

The organohydrogenpolysiloxane as the component (c) has at least one hydrogen atom directly bonded to the silicon atom in a molecule. The silicon-bonded hydrogen atoms contained in a molecule pertain to the hydrosilation reaction with the alkenyl groups in the component (b) to effect chain-length extension or crosslinking between molecules. The organohydrogenpolysiloxane is represented by the general composition formula

in which $R^4$ denotes a monovalent hydrocarbon group having 1 to 12 carbon atoms or, preferably, 1 to 8 carbon atoms and free from an aliphatic unsaturated linkage. The groups denoted by $R^4$ in a molecule each can be of the same kind as or can be different from the others. In the general composition formula, the subscript f is a positive number in the range from 1 to 2.4 or, preferably, from 1.6 to 2 and the subscript g is a positive number not exceeding 1 or, preferably, in the range from 0.002 to 1 with the proviso that f+g is a positive number preferably in the range from 1.6 to 3 while the molecular structure of the organohydrogenpolysiloxane can be any of straight chain-like structures, branched structures and resinous structures having three-dimensional networks. The viscosity of the organohydrogenpolysiloxane at 25° C. is in the range from 1 to 1000 cp or, preferably, from 5 to 200 cp. The number of the hydrogen atoms bonded to the silicon atoms in a molecule is preferably in the range from 1 to 200 or, more preferably, from 2 to 20 from the standpoint of the strengths of the cured material.

The group denoted by $R^4$ in the above given formula includes the same ones as given as the examples of R in the component i) of the above mentioned silicone rubber composition. Particular examples thereof include alkyl groups such as methyl, ethyl, propyl, butyl, hexyl, octyl, decyl, undecyl and dodecyl groups, cycloalkyl groups such as cyclohexyl and cyclooctyl groups, aryl groups such as phenyl, naphthyl, methylphenyl and xylyl groups, aralkyl groups such as benzyl, phenylethyl and cumyl groups and alkenyl groups such as vinyl, allyl and cyclohexenyl groups as well as those substituted groups by replacing a part or all of the hydrogen atoms in these unsubstituted hydrocarbon groups with halogen atoms and the like such as, for example, chloromethyl, p-chlorophenyl, m-chlorophenyl, o-chlorophenyl, p-trifluoromethylphenyl, o-trifluoromethylphenyl, 3,3,3-trifluoropropyl and cyanoethyl groups, those substituted by trimethyl silyl group or trialkoxy silyl group such as 3-trimethylsilyl propyl, 3-trimethoxysilyl propyl and 3-triethoxysilyl propyl groups and those substituted by an epoxy group such as 3-glycidoxypropyl and 2-(3,4-epoxycyclohexyl) ethyl groups and so on.

The compounding amount of the component (c) is from 1 to 50% or, preferably, from 5 to 30% by weight based on the component (b). When the compounding amount of the component (c) is too small, the crosslinkability of the composition is insufficient due to deficiency in the amount of the crosslinking agent while, when the amount thereof is too large, an excessively high crosslinking density is caused so that, in either case, the cured body sometimes cannot be imparted with high mechanical strengths. Alternatively, the compounding amount of the component (c) can be specified as such an amount that the molar ratio of the alkenyl groups in the component (b) to the hydrogen atoms directly bonded to the silicon atoms in the component (c) is from 0.2 to 10 moles/moles or, preferably, from 0.5 to 5 moles/moles.

As the organic silicon compound having at least one silanol group in a molecule as the component (d), organohydroxysilanes or organohydroxy(poly)siloxanes can be used. The organohydroxysilane is represented by the general formula $R^5_h Si(OH)_{4-h}$, in which the subscript h is 1, 2 or 3 and $R^5$ denotes an unsubstituted or substituted monovalent hydrocarbon group having 1 to 12 carbon atoms or, preferably, 1 to 8 carbon atoms and free from an aliphatic unsaturated linkage including the same ones as those given as the examples of R in the component i) of the above mentioned silicone rubber composition. Examples of the groups denoted by $R^5$ include alkyl groups such as methyl, ethyl, propyl, butyl, hexyl, octyl, decyl, undecyl and dodecyl groups, cycloalkyl groups such as cyclohexyl and cyclooctyl groups, aryl groups such as phenyl, naphthyl, methylphenyl and xylyl groups and aralkyl groups such as benzyl, phenylethyl and cumyl groups as well as those substituted groups by replacing a part or all of the hydrogen atoms in these groups with halogen atoms and the like such as, for example, chloromethyl, p-chlorophenyl, m-chlorophenyl, o-chlorophenyl, p-trifluoromethylphenyl, o-trifluoromethylphenyl, 3,3,3-trifluoropropyl and cyanoethyl groups and the like.

The organohydroxy(poly)siloxane as the other class of the silanol group-containing silicon compounds is represented by the general composition formula $$R^6_i(HO)_j SiO_{(4-i-j)/2}$$

in which $R^6$ denotes an unsubstituted or substituted monovalent hydrocarbon group having 1 to 12 carbon atoms or, preferably, 1 to 8 carbon atoms and free from an aliphatic unsaturated linkage, the subscript i is a positive number in the range from 1 to 2.5 or, preferably, from 1.5 to 2.2 and the subscript j is a positive number not exceeding 2 or, preferably, in the range from 0.05 to 2 or, more preferably, from 0.1 to 1.5 with the proviso that i+j is larger than 1 but not exceeding 3 or, preferably, in the range from 1.6 to 2.5. The molecular structure of such an organopolysiloxane can be straight chain-like, branched, cyclic and resinous having a three-dimensional network.

The group denoted by $R^6$ can be any of those given as the examples of R in the component i) of the above mentioned silicone rubber composition. Examples of the groups denoted by $R^6$ include alkyl groups such as methyl, ethyl, propyl, butyl, hexyl, octyl, decyl, undecyl and dodecyl groups, cycloalkyl groups such as cyclohexyl and cyclooctyl groups, aryl groups such as phenyl, naphthyl, methylphenyl and xylyl groups and aralkyl groups such as benzyl, phenylethyl and cumyl groups as well as those groups obtained by replacing a part or all of the hydrogen atoms in these groups with halogen atoms and the like such as, for example, chloromethyl, p-chlorophenyl, m-chlorophenyl, o-chlorophenyl, p-trifluoromethylphenyl, o-trifluoromethylphenyl and 3,3,3-trifluoropropyl groups, those groups substituted by a trimethyl silyl group or a trialkoxy silyl group such as 3-trimethylsilyl propyl, 3-trimethoxysilyl propyl and 3-triethoxysilyl propyl groups and those groups substituted by an epoxy group such as 3-glycidoxypropyl and 2-(3,4-epoxycyclohexyl)ethyl groups.

In this organohydroxysilane or organohydroxy(poly)siloxane, intercrosslinking with the epoxy resin cannot be fully accomplished and necessary strengths cannot be obtained and, in addition, the curing reaction per se is extremely retarded when the content of the silanol groups in the component (d) is too low. When the content of the silanol groups is too high, on the other hand, the silicone compound is unstable.

Such an organohydroxy(poly)siloxane can be prepared by a known method. For example, the organohydroxy(poly)siloxane can be obtained by the cohydrolysis of a mixture composed of vinyl methyl dichlorosilane and phenyl trichlorosilane with admixture of, according to need, one kind or more of tetrachlorosilane, methyl trichlorosilane, dimethyl dichlorosilane, trimethyl chlorosilane, diphenyl dichlorosilane and methyl phenyl dichlorosilane, cohydrolysis of a mixture composed of vinyl methyl chlorosilane and phenyl trichlorosilane with admixture of, according to need, one or more of tetrachlorosilane, methyl trichlorosilane, dimethyl dichlorosilane, trimethyl chlorosilane, diphenyl dichlorosilane and methyl phenyl dichlorosilane, cohydrolysis of a mixture of alkoxy silanes such as methoxy silanes, ethoxy silanes and the like corresponding to the above given respective chlorosilanes in the presence of an alkali or acid catalyst, and so on, of which the organopolysiloxane resins or intermediates of the organopolysiloxane resins obtained by the cohydrolysis of a mixture containing a trifunctional silane and/or tetrafunctional silane are preferred.

The content of silanol groups can be controlled by means of the amount of the catalyst, reaction temperature and other factors. It is further possible in the subsequent step to effect modification of the thus formed silanol groups with a silylating agent such as trimethyl chlorosilane, hexamethyl disilazane, divinyl tetramethyl disilazane and the like.

The compounding amount of the component (d) is from 0.1 to 10 parts or, preferably, from 1 to 5 parts per 100 parts of the curable epoxy resin as the component (a). When the amount is too small, curing of the epoxy resin is incomplete while, when the amount is too large, on the other hand, not only an economical disadvantage is caused but also a decrease may be caused in the physical properties of the cured body.

The organic aluminum compound as the component (e) is an aluminum compound having an organic group bonded to the aluminum atom either through an aluminum-carbon linkage or by coordination. Examples of the organic groups include alkyl groups, unsubstituted or substituted phenyl groups, haloalkyl groups, alkoxy groups, unsubstituted or substituted phenoxy groups, acyloxy groups, β-diketonato groups, o-carbonylphenolato groups and the like.

The alkyl groups as a class of the organic groups in the organic aluminum compound as the component (e) are exemplified by methyl, ethyl, n-propyl, isopropyl, n-butyl, sec-butyl, tert-butyl and n-pentyl groups, the unsubstituted or substituted phenyl groups are exemplified by phenyl, p-methoxyphenyl, o-methoxyphenyl and p-ethoxyphenyl groups, the haloalkyl groups are exemplified by chloromethyl, chloroethyl and chloropropyl groups, the alkoxy groups are exemplified by methoxy, ethoxy, isopropoxy, butoxy and pentoxy groups, the unsubstituted or substituted phenoxy groups are exemplified by phenoxy, o-methylphenoxy, o-methoxyphenoxy, o-nitrophenoxy and 2,6-dimethylphenoxy groups, the acyloxy groups are exemplified by acetato, propionato, isopropionato, butyrato, stearato, ethylacetoacetato, propylacetoacetato, butylacetoacetato, diethylmaleato and dipivaloylmethanato groups, the β-diketonato groups are exemplified by acetylacetonato, trifluoroacetylacetonato and hexafluoroacetylacetonato groups as well as those groups derived from the compounds represented by the structural formulas Ph—CO—CH$_2$—CO—CH$_3$, CH$_3$—CO—CH(CH$_3$)—CO—CH$_3$ and $(CH_3)_3C$—CO—CH$_2$—CO—C(CH$_3$)$_3$, in which Ph is a phenyl group. The o-carbonylphenolato groups are exemplified by salicylaldehydato group.

Particular examples of the organic aluminum compounds suitable as the component (e) include aluminum benzoate, trimethoxy aluminum, triethoxy aluminum, triisopropoxy aluminum, triphenoxy aluminum, tri(p-methylphenoxy) aluminum, isopropoxy diethoxy aluminum, tributoxy aluminum, triacetoxy aluminum, tristearato aluminum, tributyrato aluminum, tripropionato aluminum, triisopropionato aluminum, tris(acetylacetonato) aluminum, tris (trifluoroacetylacetonato) aluminum, tris(salicylaldehydato) aluminum, tris(pentafluoroacetylacetonato) aluminum, tris (ethylacetonato) aluminum, ethylacetato diisopropoxy aluminum, tris(diethylmalorato) aluminum, tris(propylacetoacetato) aluminum, tris(butylacetoacetato) aluminum, tris(isopropylacetoacetato) aluminum, tris(dipivaloylmethanato) aluminum, diacetylacetonato dipivaloylmethanoto aluminum, diacetylacetonato dipivaloylmethanato aluminum and ethylacetoacetato diisopropoxy aluminum as well as those co-ordination compounds expressed by the following formulas:

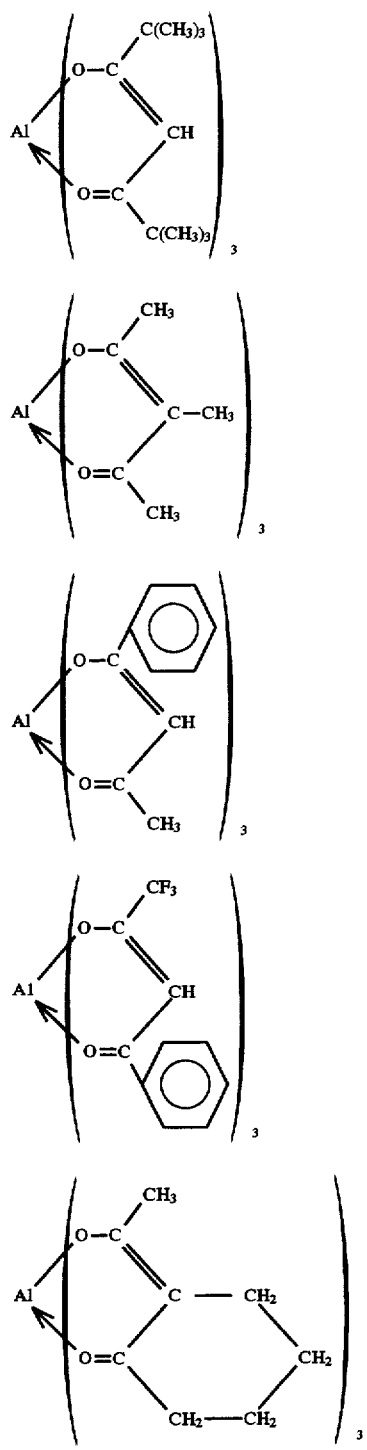

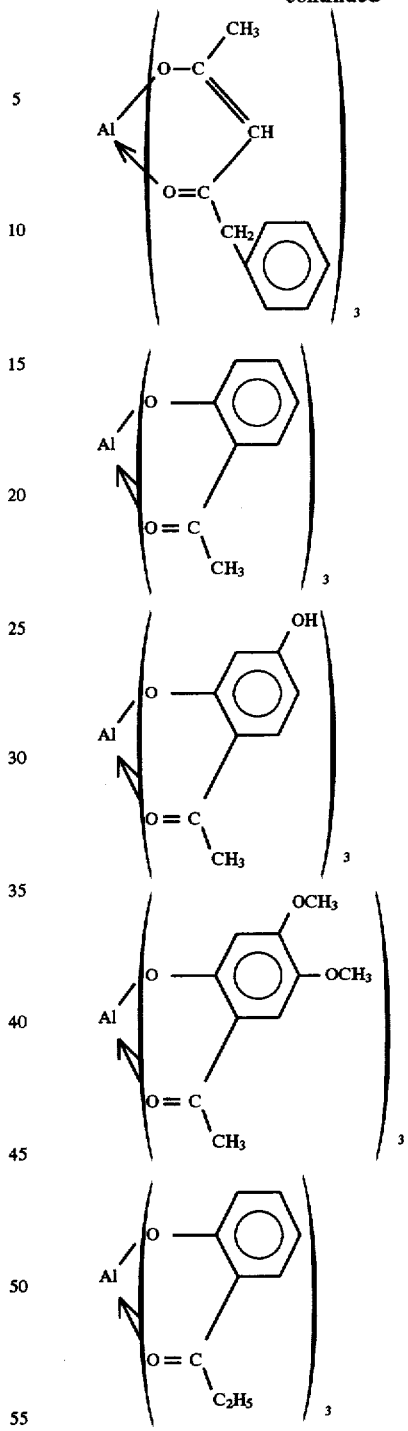

These organic aluminum compounds can be used either singly or as a combination of two kinds or more according to need. The amount thereof in the composition is in the range from 0.001 to 10 parts or, preferably, from 0.01 to 5 parts per 100 parts of the curable epoxy resin as the component (a). When the amount thereof is too small, the curing characteristic of the composition is incomplete while, when the amount thereof is too large, an increase in the cost is caused and the physical properties and adhesion of the composition after curing are adversely influenced.

The platinum group metal compound as the component (f) serves as a catalyst to promote the addition reaction or the hydrosilation reaction between the alkenyl groups in the organopolysiloxane as the component (b) and the SiH groups in the organohydrogenpolysiloxane as the component (c). Examples of suitable catalytic compounds include platinum black, platinic chloride, chloroplatinic acid, reaction products of chloroplatinic acid and a monohydric alcohol, complexes of chloroplatinic acid with an olefin, platinum bisacetoacetate, palladium-based catalysts, rhodium-based catalysts and the like. They are used in an amount of 0.1 to 500 ppm by weight or, preferably, 0.5 to 200 ppm by weight as the metal of platinum, palladium or rhodium based on the component (b). When the amount is too small, complete curing cannot be accomplished while, on the other hand, no additional advantages can be obtained rather with an economical disadvantage by increasing the amount to exceed the above mentioned upper limit.

It is not always essential that the components (a) to (f) described above are each a respectively independent individual compound so that, for example, an organopolysiloxane having at least two lower alkenyl groups and having at least one silanol group in molecule can act both as the component (b) and as the component (d). In this case, the applicable molecular structure and compounding amount of such a compound for dual service are each a combination of the respective ranges. For example, in the above given general composition formula of the organohydroxy(poly)siloxane as the component (d), of which the groups denoted by $R^6$ in a molecule include at least two on an average or, preferably, from 2 to 80% by moles or, more preferably, from 2 to 20% by moles of lower alkenyl groups such as vinyl, allyl, propenyl and butenyl groups in the overall $R^6$ groups, this organohydroxy(poly)siloxane can be compounded in an amount of 5 to 500 parts or, preferably, from 20 to 200 parts per 100 parts of the curable epoxy resin as the component (a) and, in this case, the component (b) can be omitted.

In addition to the components (a) to (f), furthermore, it is optional according to need to admix the composition with various kinds of fine powders and fibrous materials as a filler such as fused silica powder, crystalline silica powder, glass powder, glass fibers, clay, talc, mica, asbestos, zinc oxide, magnesia, aluminum silicate, zirconium silicate, alumina, fumed silica filler and the like in such an amount that the adhesive bonding with the silicone rubber composition is not adversely affected after curing.

In the method of the present invention for the preparation of a monolithically integrated composite body of a cured silicone rubber and a cured silicone-epoxy resin composition, in the first place, either one of the above mentioned silicone rubber composition and the silicone-epoxy resin composition is cured and shaped at room temperature or by heating, preferably, in a metal mold. The method for shaping of the composition is not particularly limited depending on the rheological properties and curing behavior of the composition and any of the conventional methods such as castmolding, compression molding, injection molding, extrusion molding, transfer molding and others is applicable. This step to effect curing of either one of the compositions is referred to as the "primary shaping" hereinafter.

After either one of the compositions has been cured and shaped in the primary shaping, for example, in a metal mold, the other composition is brought into direct contact with the primarily shaped and cured body of the first composition and subjected to shaping and curing at room temperature or by heating. This step of curing and shaping of the second composition is referred to as the "secondary shaping" hereinafter. By successively conducting the primary shaping and secondary shaping, a monolithically integrated composite body consisting of the first part shaped and cured in the primary shaping and the second part shaped and cured in the secondary shaping can be obtained with very firm adhesive bonding between the two parts. The shaping method in the secondary shaping can also be freely selected depending on the rheological properties and curing behavior of the composition and other factors and any of the conventional methods such as cast-molding, compression molding, injection molding, extrusion molding, transfer molding and the like is applicable.

It is not always necessary that the timing to conduct the secondary shaping is after complete curing of the primarily shaped part and no problems are encountered by starting the secondary shaping even before complete curing of the primarily shaped part provided that the primary shaping has been effected to such an extent that an interface can be formed without intermixing of the two compositions.

In the following, examples are given to more fully describe the present invention although the scope of the present invention is never limited thereto. In the following examples, the term of "parts" refers to "parts by weight" and the term of "%" refers to "% by weight", if not specified otherwise, and the values of viscosity always refer to the value at 25° C.

EXAMPLE 1

A silicone-epoxy resin composition, referred to as the composition A hereinafter, was prepared by admixing 100 parts of an epoxy resin of the bisphenol A-type (Epikote 828, a commercial product by Shell Chemical Co.) having an epoxy equivalent of 190 to 210 and a molecular weight of 380 with 10 parts of an epoxy compound 3,4-epoxycyclohexylmethyl 3,4-epoxycyclohexyl carboxylate, 10 parts of an organopolysiloxane having a viscosity of 4000 cp and expressed by the formula given below:

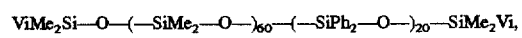

in which Vi is a vinyl group, Me is a methyl group and Ph is a phenyl group, 1.5 parts of an organohydrogenpolysiloxane having a viscosity of 25 cp and expressed by the formula given below:

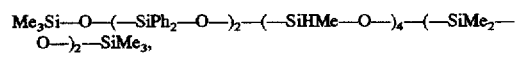

in which each symbol has the same meaning as defined above, 1.5 parts of diphenylsilane diol, 0.6 part of aluminum benzoate and 0.1 part of an isopropanol solution of chloroplatinic acid in a concentration of 0.5% as platinum.

Separately, a silicone rubber composition, referred to as the composition B hereinafter, was prepared by admixing 100 parts of a dimethylpolysiloxane having a viscosity of 10000 cp and blocked at each molecular chain end with a dimethyl vinyl siloxy group with 30 parts of a fumed silica filler having a specific surface area of 200 m²/g, 6 parts of hexamethyl disilazane and 2 parts of water under heating at 150° C. for 3 hours and then with 0.4 part of a dimethylsiloxane-methylhydrogensiloxane copolymer of 10 cp viscosity consisting of 50% by moles of fie dimethyl siloxane units and 50% by moles of the methyl hydrogen siloxane units and blocked at each molecular chain end with a trimethyl silyl group and 0.1 part of the same isopropanol solution of chloroplatinic acid as described above.

In the next place, the cavity 2 of the lower mold 1 of the metal mold having a vertical cross section schematically illustrated in FIG. 1 was half filled with the above prepared composition A, which was cured by heating at 150° C. for 3 minutes followed by closure of the lower mold 1 with the upper mold 3 mounted thereon. Then, the composition B was introduced by injection into the cavity 2 through the injection port 4 provided in the upper part of the upper mold 3 on to the already cured composition A to fill the space under an injection pressure of 60 kg/cm$^2$ and cured by heating at 150° C. for 5 minutes to give a monolithically integrated composite cured article by firm bonding of the two parts, one, of the silicone-epoxy resin composition as the part A and, the other, of the silicone rubber composition as the part B.

The thus obtained monolithically integrated composite article was subjected to a post-curing treatment at 150° C. for 3 hours and then subjected to the measurements of the hardness of the respective parts according to the procedure specified in JIS K 6301. The results were that the JIS A hardness of the part A was higher than the measurable upper limit of 95 by the method while the part B had a hardness of 35.

EXAMPLE 2

Another silicone-epoxy resin composition, referred to as the composition C hereinafter, was prepared by admixing 100 parts of the same epoxy resin as used in Example 1 with 10 parts of the same epoxy compound as used in Example 1, 50 parts of another organopolysiloxane expressed by the average composition formula given below:

$$Me_{1.02}Ph_{0.40}Vi_{0.08}SiO_{1.25},$$

in which each symbol has the same meaning as defined above and which was prepared by the cohydrolysis of a mixture of vinyl methyl dichlorosilane, dimethyl dichlorosilane and phenyl trichlorosilane at 90° C. followed by separation and neutralization by washing with water and by the trimethyl silylation of the remaining silanol groups with hexamethyl disilazane followed by further washing with water and separation, 2 parts of the same organohydrogenpolysiloxane as used in Example 1, 3 parts of a methyl hydrogen polysiloxane having a viscosity of 2 cp and expressed by the formula given below:

$$Me_3Si\text{—}O\text{—}(\text{—}SiHMe\text{—}O\text{—})_4\text{—}SiMe_3,$$

in which Me is a methyl group, 1.5 parts of aluminum benzoate and 0.3 part of the same isopropanol solution of chloroplatinic acid as used in Example 1.

In the next place, a monolithically integrated composite cured article was prepared in substantially the same manner as in Example 1 excepting the use of the above described composition C in place of the composition A in Example 1.

The thus obtained monolithically integrated composite article was subjected to a post-cure treatment under the same conditions as in Example 1 and subjected to the measurement of the hardness of the respective parts to find that the part obtained from the composition C had a JIS A hardness of 95 or higher while the part of the silicone rubber composition B had a hardness of 35.

EXAMPLE 3

Another silicone rubber composition, referred as the composition D hereinafter, was prepared by admixing 100 parts of a dimethyl polysiloxane having a viscosity of 100,000 cp blocked at each molecular chain end with a trivinyl siloxy group with 30 parts of the same fumed silica filler as used in Example 1, 6 parts of hexamethyl disilazane and 2 parts of water by mixing at 150° C. for 3 hours and then with 50 parts of the same trivinyl siloxy-blocked dimethyl polysiloxane as used in Example 2 and 1.0 part of 1,6-bis(tert-butylperoxy) hexane.

By using the same metal mold as used in Example 1, the silicone-epoxy resin composition C was poured thereinto to half fill the cavity in the same manner as in Example 1 and cured at 170° C. for 2 minutes followed by the injection of the above prepared composition D also in the same manner as in Example 1 on to the already cured composition C and the composition D was cured by heating at 170° C. for 5 minutes to give a monolithically integrated composite article with firm bonding between the two parts.

This monolithically integrated composite article was subjected to a post-curing treatment at 170° C. for 3 hours and subjected to the measurement of the hardness of the respective parts to find that the part obtained from the composition C had a JIS A hardness of 95 or higher while the part of the silicone rubber composition D had a hardness of 35.

EXAMPLE 4

A third silicone-epoxy resin composition, referred to as the composition E hereinafter, was prepared by admixing 100 parts of the same epoxy resin as used in Example 1 with 10 parts of the same epoxy compound as used in Example 1, 50 parts of an organopolysiloxane expressed by the average composition formula given below:

$$Vi_{0.1}Me_{0.6}Ph_{0.55}(HO)_{0.25}SiO_{1.25},$$

in which each symbol has the same meaning as defined above and which was obtained by the cohydrolysis of a mixture of vinyl methyl dichlorosilane, dimethyl dichlorosilane and phenyl trichlorosilane at 90° C. followed by separation, washing with water to obtain neutrality and drying, 8 parts of the same organohydrogenpolysiloxane as used in Example 1, 0.6 part of aluminum benzoate and 0.1 part of the same isopropanol solution of chloroplatinic acid as used in Example 1.

The curing test by using the metal mold was performed in the same manner as in Example 1 excepting replacement of the composition A with the above prepared composition E.

The thus obtained monolithically integrated composite article was subjected to the post-curing treatment in the same manner as in Example 1 and subjected to the measurement of the hardness of the respective parts to find JIS A values of 95 or higher in the part of the composition E and 35 in the part of the composition B.

COMPARATIVE EXAMPLE 1

An epoxy resin composition, referred to as the composition F hereinafter, was prepared by admixing 100 parts of the same epoxy resin as used in Example 1 with 10 parts of the same epoxy compound as used in Example 1, 1.5 parts of diphenylsilane diol and 0.5 part of aluminum benzoate.

In the next place, the cavity 2 of the lower mold 1 of the metal mold shown in FIG. 1 was half filled by pouring the composition F thereinto which was cured by heating at 150° C. for 3 minutes followed by closure of the lower mold 1 with the upper mold 3 mounted thereon and injection of the silicone rubber composition B used in Example 1 through the inlet port 4 provided in the upper part of the upper mold 3 on to the already cured epoxy resin composition F under an injection pressure of 60 kg/cm² which was cured by heating at 150° C. for 5 minutes. The result of this molding test was that a monolithically integrated composite body consisting of the two parts could not be obtained and, still worse, the cured epoxy resin composition was adhesively bonded to the metal mold with such firmness that the adhering epoxy resin composition could hardly be removed from the metal mold.

EXAMPLE 5

A third silicone rubber composition, referred to as the composition G hereinafter, was prepared by compounding 70 parts of a dimethyl polysiloxane having a viscosity of 5000 cp blocked at each molecular chain terminal with a dimethyl vinyl siloxy group with 30 parts of a fumed silica filler having a specific surface area of 300 m²/g, 6 parts of hexamethyl disilazane and 3 parts of water at 150° C. for 3 hours followed by further admixture of the mixture with 50 parts of the same dimethyl polysiloxane as used above, 0.45 part of the same dimethylsiloxane-methylhydrogensiloxane copolymer as used in Example 1 and 0.1 part of the same isopropanol solution of chloroplatinic acid as used in Example 1.

In the next place, the cavity 2 of the lower mold 1 of the metal mold having a vertical cross section schematically illustrated in FIG. 1 was half filled with the above prepared composition G, which was cured by heating at 150° C. for 90 seconds followed by closure of the lower mold 1 with the upper mold 3 mounted thereon. Then, the composition E prepared in Example 4 was introduced by injection into the cavity 2 through the injection port 4 provided in the upper part of the upper mold 3 to half fill the cavity on to the already cured silicone rubber composition G under an injection pressure of 60 kg/cm² and cured by heating at 150° C. for 7 minutes to give a monolithically integrated composite cured article by firm bonding between the two parts, one, of the silicone rubber composition as the part G and, the other, of the silicone-epoxy resin composition as the part E.

The thus obtained monolithically integrated composite article was subjected to a post-curing treatment at 150° C. for 3 hours and then subjected to the measurements of the hardness of the respective parts according to the procedure specified in JIS K 6301. The results were that the JIS A hardness of the part obtained from the composition G was 45 and the part obtained from the composition E had a hardness higher than the measurable upper limit of 95 by the method.

What is claimed is:

1. A monolithically integrated cured composite body which is an integral body consisting of a part of a cured silicone rubber composition and a part of a cured silicone-epoxy resin composition in direct adhesive bonding without intervention of a third material therebetween, the silicone rubber composition being cured by means of an organic peroxide as a curing agent or cured by a hydrosilation reaction between silicon-bonded ethylenically unsaturated groups and silicon-bonded hydrogen atoms in the composition and the cured silicone-epoxy resin composition being cured from a uniform blend which comprises:

(a) 100 parts by weight of a curable epoxy resin;
    (b) from 5 to 500 parts by weight of an organopolysiloxane having at least two on an average of lower alkenyl groups in a molecule;
    (c) from 1 to 50% by weight, based on the component (b), of an organohydrogenpolysiloxane having at least one hydrogen atom bonded to a silicon atom in a molecule and represented by the general composition formula

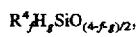

in which $R^4$ denotes a monovalent hydrocarbon group optionally substituted by halogen, cyano, trimethylsilyl, trialkoxysilyl or epoxy groups, the subscript "f" denotes a positive number in the range from 1 to 2.4 and the subscript "g" denotes a positive number not exceeding 1;

(d) from 0.1 to 10 parts by weight of an organosilicon compound having at least one silanol group in a molecule;
    (e) from 0.001 to 10 parts by weight of an organic aluminum compound; and
    (f) a compound of a platinum group metal in an amount in the range from 0.1 to 500 ppm by weight of the metal, based on the component (b).

2. The composite body of claim 1, wherein the silicone rubber composition comprises an organopolysiloxane and a catalytic amount of an organic peroxide.

3. The composite body of claim 2, wherein the silicone rubber composition further comprises a filler.

4. The composite body of claim 1, wherein the silicone rubber composition comprises an organopolysiloxane containing at least two alkenyl groups in a molecule, an organohydrogenpolysiloxane in the form of a liquid at room temperature and a catalyst for promoting a hydrosilylation reaction.

5. The composite body of claim 4, wherein the silicone rubber composition further comprises a filler.

6. A monolithically integrated cured composite body which is an integral body consisting of a part of a cured silicone rubber composition and a part of a cured silicone-epoxy resin composition in direct adhesive bonding without intervention of a third material therebetween, the silicone rubber composition being cured by means of an organic peroxide as a curing agent or cured by a hydrosilation reaction between silicon-bonded ethylenically unsaturated groups and silicon-bonded hydrogen atoms in the composition and the cured silicone-epoxy resin composition being cured from a uniform blend which comprises:

(a) 100 parts by weight of a curable epoxy resin;
    (c) from 1 to 50% by weight, based on the component (d') below of an organohydrogenpolysiloxane having at least one hydrogen atom bonded to a silicon atom in a molecule and represented by the general composition formula

in which $R^4$ denotes a monovalent hydrocarbon group optionally substituted by halogen, cyano, trimethylsilyl, trialkoxysilyl or epoxy groups, the subscript "f" denotes a positive number in the range from 1 to 2.4 and the subscript "g" denotes a positive number not exceeding 1;

(d') from 5 to 500 parts by weight of an organopolysiloxane compound having at least one silanol group and at least two lower alkenyl groups in a molecule and represented by the general composition formula

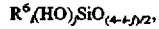

in which $R^6$ is a monovalent hydrocarbon group having 1 to 12 carbon atoms optionally substituted by halogen, trimethylsilyl, trialkoxysilyl or epoxy groups, of which from 2 to 80% by moles are lower alkenyl groups, the subscript "i" is a positive number in the range from 1 to 2.5 and the subscript "j" is a positive number not exceeding 2 with the proviso that "i+j" is in the range from 1 to 3;

(e) from 0.001 to 10 parts by weight of an organic aluminum compound; and (f) a compound of a platinum group metal in an amount in the range from 0.1 to 500 ppm by weight of the metal, based on the component (d').

7. The composite body of claim 6, wherein the silicone rubber composition comprises an organopolysiloxane and a catalytic amount of an organic peroxide.

8. The composite body of claim 7 wherein the silicone rubber composition further comprises a filler.

9. The composite body of claim 6 wherein the silicone rubber composition comprises an organopolysiloxane containing at least two alkenyl groups in a molecule, an organohydrogenpolysiloxane in the form of a liquid at room temperature and a catalyst for promoting a hydrosilylation reaction.

10. The composite body of claim 9, wherein the silicone rubber composition further comprises a filler.

11. A method for the preparation of a monolithically integrated cured composite body consisting of a first part of a cured silicone rubber composition and a second part of a cured silicone-epoxy resin composition, which method comprises:

(A) at least partly curing either one of a silicone rubber composition curable by organic peroxide or hydrosilation or a curable silicone-epoxy resin composition, which is a uniform blend comprising:
(a) 100 parts by weight of a curable epoxy resin;
(b) from 5 to 500 parts by weight of an organopolysiloxane having at least two, on average, lower alkenyl groups in a molecule;
(c) from 1 to 50% by weight, based on the component (b), of an organohydrogenpolysiloxane having at least one hydrogen atom bonded to a silicone atom in a molecule and represented by the general composition formula

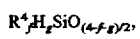

in which $R^4$ denotes a monovalent hydrocarbon group optionally substituted by halogen, cyano, trimethylsilyl, trialkoxysilyl or epoxy groups, the subscript "f" denotes a positive number in the range from 1 to 2.4 and the subscript "g" denotes a positive number not exceeding 1;

(d) from 0.1 to 10 parts by weight of an organosilicon compound having at least one silanol group in a molecule;

(e) from 0.001 to 10 parts by weight of an organic aluminum compound; and (f) a compound of a platinum group metal in an amount in the range from 0.1 to 500 ppm by weight of the metal, based on the component (b), at room temperature or by heating, in a metal mold to obtain a cured part;

(B) bringing the other of the curable silicone rubber composition or the curable silicone-epoxy resin composition into direct contact with the cured part from (A) in the metal mold; and (C) curing the composition introduced into the metal mold in (B), at room temperature or by heating, in the metal mold.

12. A method for the preparation of a monolithically integrated cured composite body consisting of a first part of a cured silicone rubber composition and a second part of a cured silicone-epoxy resin composition, which method comprises:

(A) at least partly curing either one of a silicone rubber composition curable by organic peroxide or hydrosilation or a curable silicone-epoxy resin composition, which is a uniform blend comprising:
(a) 100 parts by weight of a curable epoxy resin;
(c) from 1 to 50% by weight, based on the component (d') below of an organohydrogenpolysiloxane having at least one hydrogen atom bonded to a silicon atom in a molecule and represented by the general composition formula

in which $R^4$ denotes a monovalent hydrocarbon group optionally substituted by halogen, cyano, trimethylsilyl, trialkoxysilyl or epoxy groups, the subscript "f" denotes a positive number in the range from 1 to 2.4 and the subscript "g" denotes a positive number not exceeding 1;

(d') from 5 to 500 parts by weight of an organopolysiloxane compound having at least one silanol group and at least two lower alkenyl groups in a molecule and represented by the general composition formula

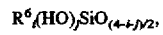

in which $R^6$ is a monovalent hydrocarbon group having 1 to 12 carbon atoms optionally substituted by halogen, trimethylsilyl, trialkoxysilyl or epoxy groups, of which from 2 to 80% by moles are lower alkenyl groups, the subscript "i" is a positive number in the range from 1 to 2.5 and the subscript "j" is a positive number not exceeding 2 with the proviso that "i+j" is in the range from 1 to 3;

(e) from 0.001 to 10 parts by weight of an organic aluminum compound; and (f) a compound of a platinum group metal in an amount in the range from 0.1 to 500 ppm by weight of the metal, based on the component (d'), at room temperature or by heating, in a metal mold to obtain a cured part;

(B) bringing the other of the curable silicone rubber composition or the curable silicone-epoxy resin composition into direct contact with the cured part from (A) in the metal mold; and (C) curing the composition introduced into the metal mold in (B), at room temperature or by heating, in the metal mold.

* * * * *